(12) United States Patent
Watanabe

(10) Patent No.: US 6,514,025 B2
(45) Date of Patent: Feb. 4, 2003

(54) SCREW MEMBER WITH ELASTICALLY DEFORMABLE FEATURES

(75) Inventor: Tetsuya Watanabe, Ayase (JP)

(73) Assignee: Yusaku Ishimori, Kanagawa (JP)

( * ) Notice: Subject to any disclaimer, the term of this patent is extended or adjusted under 35 U.S.C. 154(b) by 0 days.

(21) Appl. No.: 09/862,073

(22) Filed: May 21, 2001

(65) Prior Publication Data
US 2002/0044850 A1 Apr. 18, 2002

(30) Foreign Application Priority Data
Oct. 2, 2000 (JP) .................................. 2000-302726

(51) Int. Cl.[7] ............................................. F16B 39/30
(52) U.S. Cl. ...................................................... 411/311
(58) Field of Search ....................... 411/309–311, 411, 411/412

(56) References Cited

U.S. PATENT DOCUMENTS

| | | | |
|---|---|---|---|
| 793,824 A | * | 7/1905 | Culliney |
| 2,787,796 A | * | 4/1957 | Rosan |
| 3,517,717 A | * | 6/1970 | Orlomoski |
| 3,850,215 A | * | 11/1974 | Orlomoski |
| 4,764,067 A | * | 8/1988 | Kawashima |
| 6,216,510 B1 | * | 4/2001 | Hashimoto |

FOREIGN PATENT DOCUMENTS

| | | |
|---|---|---|
| EP | 0 930 441 A1 | 7/1999 |
| JP | 56-19492 | 5/1981 |
| JP | 3-46686 | 7/1991 |
| JP | 07083224 | 3/1995 |
| JP | 07139536 | 5/1995 |
| JP | 07197924 | 8/1995 |

* cited by examiner

Primary Examiner—Flemming Saether
(74) Attorney, Agent, or Firm—McCormick, Paulding & Huber LLP

(57) ABSTRACT

A screw member having a loosening prevention function is provided to improve a fastening power and a relative strength in thread connection. With an arrangement to provide a first crest portion and a second crest portion at the opposite ends of a thread point, a first screw member generates a loosening prevention effect due to elastic deformation of the first crest portion and the second crest portion, with the entire thread flank from the base portion to the point brought into contact with a second screw member on the both surfaces of the thread flanks. With this arrangement, a strong fastening power can be obtained, and a clamping force applied to the thread is distributed over the thread, thereby enabling improvement in the relative strength in thread connection.

3 Claims, 3 Drawing Sheets

SCREW MEMBER WITH ELASTICALLY DEFORMABLE FEATURES

FIELD OF THE INVENTION

The present invention relates to a screw member for fastening a plurality of members to be fastened, and more particularly, relates to a technique for preventing the fastening of the members from becoming loose.

BACKGROUND OF THE INVENTION

In order to fasten a plurality of members to be fastened, screw members such as bolts and nuts are often used, and in order to prevent the fastened screw members from becoming loose, a locking member such as a spring washer is normally used.

In order to prevent the screw members fastened to each other from becoming loose, without using such an additional part, there has been used a self-lock screw member as described in the Japanese Patent Publication No. 56-19492 and the Japanese Patent Publication No. 3-46686.

The self-lock screw member described in the Japanese Patent Publication No. 56-19492 is constructed such that a flank angle of a screw thread of a first screw member is set to be smaller than a flank angle of a screw thread of a second screw member meshed therewith, and in the thread of the first screw member, there is formed a slit radially extending from the point thereof. This screw member is formed such that when the first screw member and the second screw member are thread-connected, the thread of the first screw member elastically deforms in the direction that the slit becomes narrow, and due to a righting moment thereof, the self-lock function is exhibited.

SUMMARY OF THE INVENTION

However, in this self-lock screw member, an intersecting angle formed by a thread flank of the first screw member and the top portion of the screw thread is relatively small. Accordingly, in a case where the first and second screw members are thread-connected the thread point of the first screw member may sink into the flank of the second screw member, or the point may elastically deform before the screw thread of the first screw member elastically deforms.

In this connection, with the self-lock screw member as described in the Japanese Patent Publication No. 3-46686, the thread flank of the first screw member is constituted of a pair of first slopes forming from the base portion of the thread to the middle portion of the thread; and a pair of second slopes forming from the middle portion of the thread to the point, wherein an intersecting angle with the first slope is an obtuse angle. Also, a flank angle formed by the pair of first slopes is set to be smaller than that of the thread of the second screw member meshed therewith, and a flank angle formed by the pair of second slopes is set to be larger than a flank angle formed by the pair of first slopes.

Accordingly, when the first screw member and the second screw member are thread-connected, the thread of the first screw member comes in contact with the thread of the second screw member in an intersecting portion of the first slope and the second slope, that is, in an obtuse-angled portion. As a result, there is no possibility that a part of the thread of the first screw member sinks into the flank of the second screw member, nor the contact portion elastically deforms.

With the self-lock screw member as described in the Japanese Patent Publication No. 3-46686, however, since the thread of the first screw member is constituted of two surfaces, the contact area between the thread of the first screw member and the thread of the second screw member at the time of thread connection is reduced, compared to the case of the self-lock screw member as described in the Japanese Patent Publication No. 56-19492. Therefore, there is a problem in that a fastening power and a relative strength of the first screw member and the second screw member decrease.

It is an object of the present invention to improve a fastening power and a relative strength in thread connection of screw members having a loosening prevention function.

A screw member of the present invention is a screw member, comprising a first screw member having a screw body and a screw thread formed by helically protruding from said screw body, said screw thread having two thread flanks and formed with a notch groove at a top portion of said screw thread; a second screw member which is thread-connected with said first screw member by a relative rotation about a center of an axis; a first crest portion formed around said top portion of said screw thread, having a first inner surface extending into said notch groove of said screw thread and having a first flank continuous to one of said thread flanks; a second crest portion formed around said top portion of said screw thread, having a second inner surface extending into said notch groove facing said first inner surface via said notch groove, and having a second flank continuous to the other of said thread flanks; said first flank and said second flank of said first and second crest portions being provided to form an intersecting angle to be set smaller than a flank angle formed by said two thread flanks; and said respective crest portions being provided to elastically deform so as to approach to each other when said first screw member is thread-connected with said second screw member, to thereby apply a fastening power to said second screw member.

According to the present invention, the thread-connected two screw members exhibits a loosening prevention effect due to elastic deformation of the first crest portion and the second crest portion, while bringing the entire thread flank from the base portion to the point into contact with the other screw member on the both flanks of the screw thread. As a result, a strong fastening power can be obtained, and a clamping force applied to the screw thread is distributed over the thread, thereby enabling improvement in the relative strength in thread connection.

A screw member of the present invention is a screw member, comprising: a first screw member having a screw body and a screw thread formed by helically protruding from said screw body, said screw thread having two thread flanks and formed with a notch groove at a top portion of said screw thread; a second screw member which is thread-connected with said first screw member by a relative rotation about a center of an axis; a first crest portion formed around said top portion of said screw thread, having a first inner surface extending into said notch groove of said screw thread and having a first flank continuous to one of said thread flanks; a second crest portion formed around said top portion of said screw thread, having a second inner surface extending into said notch groove facing said first inner surface via said notch groove, and having a second flank continuous to the other of said thread flanks; said first flank and said second flank of said first and second crest portions being provided to form an intersecting angle to be set smaller than a flank angle formed by said two thread flanks; and said respective crest portions being provided to bite into said second screw member when said first screw member is thread-connected with said second screw member.

According to the present invention, since the both crest portions formed on the first screw member bite into the second screw member while cutting the second screw member, the contact area between the both screw members increases, and the first screw member serves as a tapping screw, thereby enabling reliable prevention of loosening.

A screw member according to the present invention may be such that the first screw member is a bolt and the second screw member is a nut, or the first screw member is a nut and the second screw member is a bolt.

BRIEF DESCRIPTIONS OF THE DRAWINGS

Figure 1:
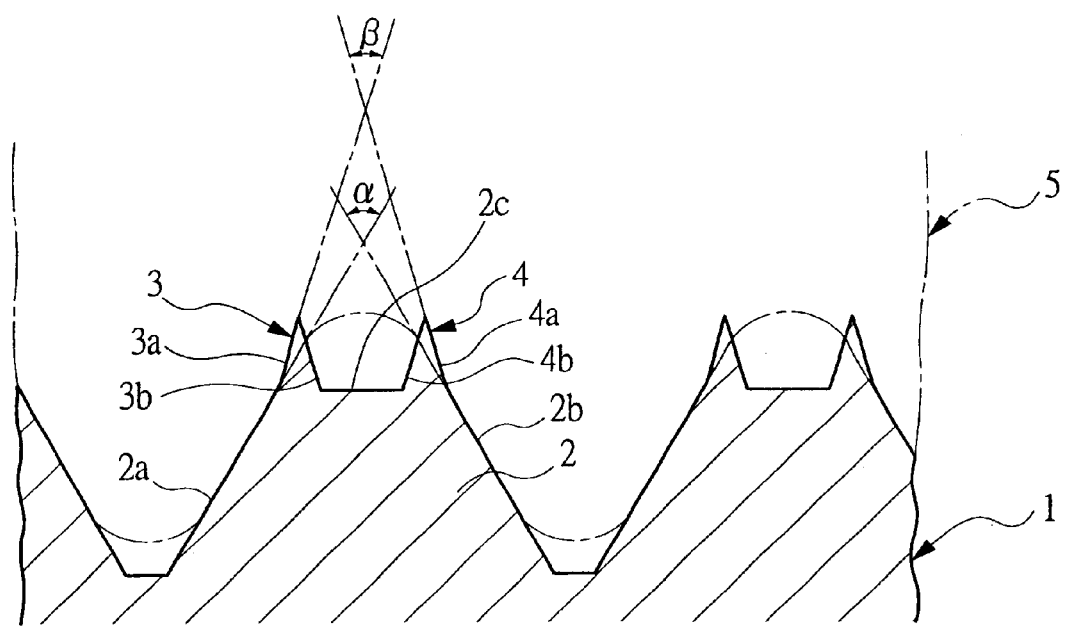
FIG. 1 is a sectional view showing a screw member, being one embodiment of the present invention.
Figure 3:
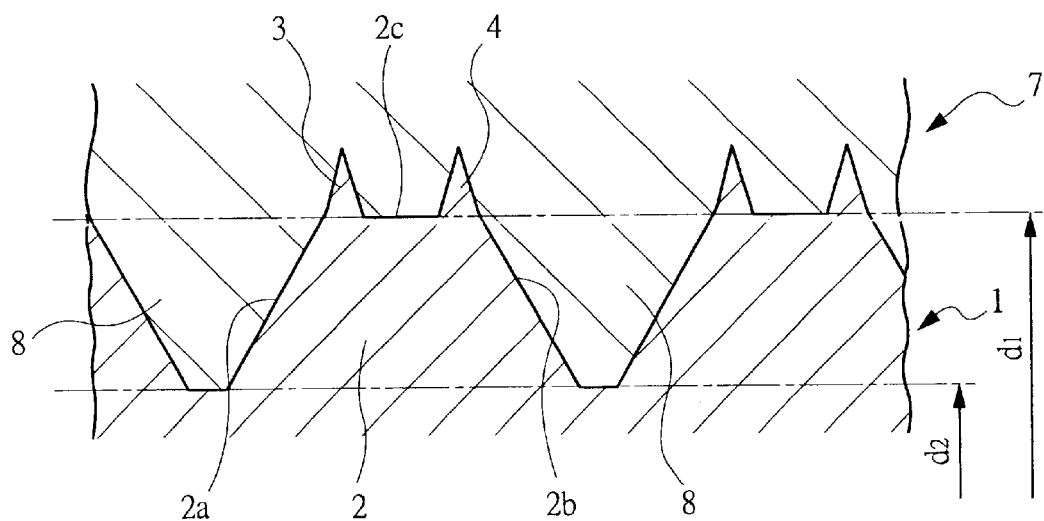
Figure 4A:
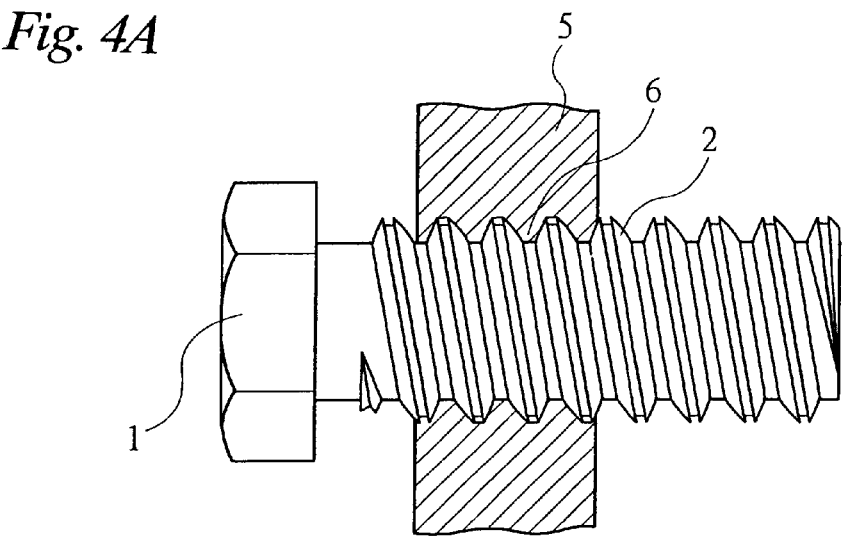
Figure 4B:
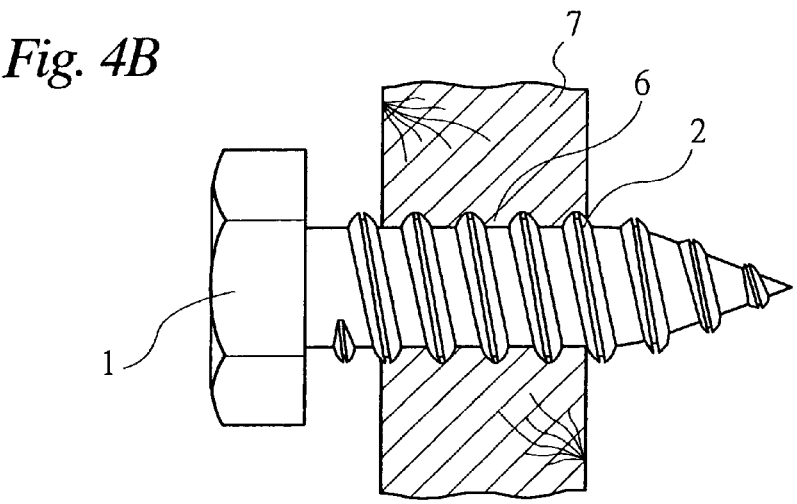
Figure 4C:
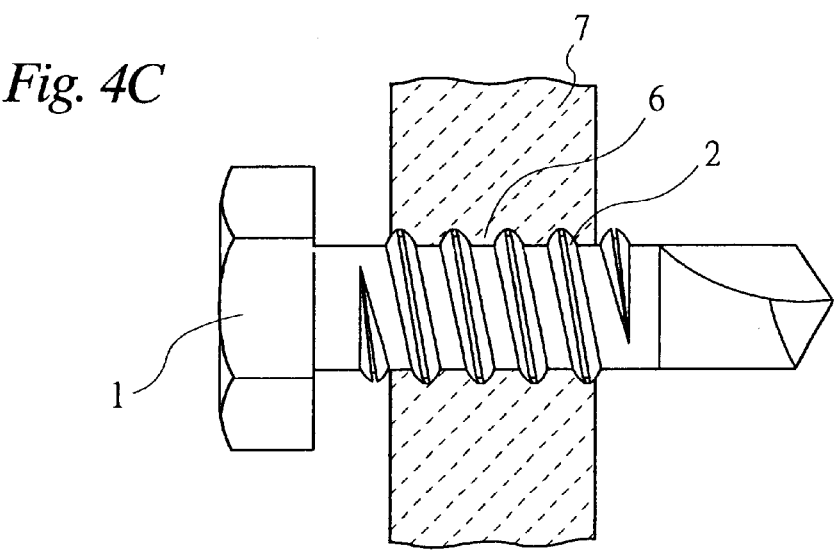

FIG. 3 is a sectional view showing the state in which the screw member shown in FIG. 1 is used as a tapping screw, and is thread-connected to an other screw member; and FIG. 4A is a sectional view showing the whole screw member comprising a first screw member and a second screw member, FIG. 4B is a sectional view showing a modified example of screw member and FIG. 4C is a sectional view showing a further modified example of screw member.

DESCRIPTION OF THE PREFERRED EMBODIMENTS

Embodiments of the present invention will now be described, with reference to the drawings.

Figure 2:
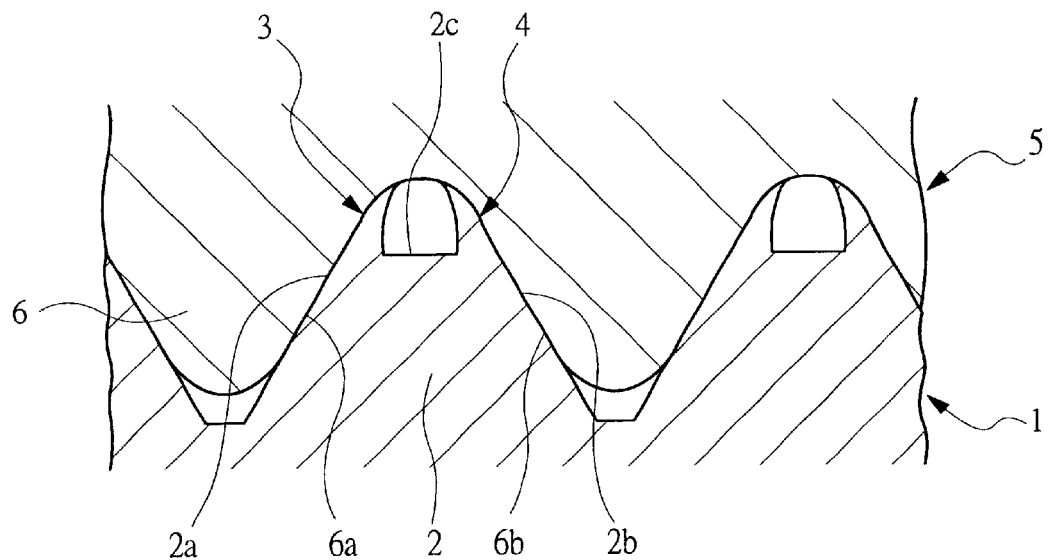
FIG. 2 is a sectional view showing the case where the screw member shown in FIG. 1 is thread-connected to an other screw member.

FIG. 1 is a sectional view showing a part of a screw member, which is one embodiment of the present invention. FIG. 2 is a sectional view showing the state in which this screw member is thread-connected with an other screw member. FIG. 3 shows the state in which the screw member shown in FIG. 1 and FIG. 2 is thread-connected to a second screw member in which a screw thread is formed having a screw groove with an inner diameter $d_1$. FIGS. 4A to 4C are sectional views showing a whole screw member.

FIG. 4A shows a screw member comprising a first screw member 1 consisting of a bolt, and a second screw member 5 consisting of a nut. The first screw member 1 has screw threads 2 formed thereon, helically protruding from the circumference of a screw body in a cylinder shape, with a screw groove formed between screw threads. On the other hand, the second screw member 5 has screw threads 6 formed thereon, helically protruding from the inner periphery of an annular screw body, with respective screw threads 6 engaging with the screw groove of the first screw member 1.

As shown in FIG. 1, the first screw member 1 constituting the screw member of the present invention has a first screw thread 2 formed by helically protruding from the screw body, which has thread flanks 2a, 2b forming a flank angle α and a thread point, and the first screw member 1 is thread-connected with a second screw member 5 having a second screw thread 6 forming a flank angle α shown by a two-dot chain line, by a relative rotation about a center of an axis.

At the point of the screw thread 2 of the first screw member 1, there is formed notch groove 2c having a flat shape, which has inner surfaces 3b, 4b facing to each other, that is, the notch groove 2c is formed to be helically continuous.

On the opposite ends of the thread point, there are formed a first crest portion 3 having a first crest portion flank 3a continuous to the thread flank 2a and a first inner surface 3b of the notch groove 2c, and a second crest portion 4 having a second crest portion flank 4a continuous to the thread flank 2b and a second inner surface 4b of the notch groove 2c, the first crest portion 3 and the second crest portion 4 being formed towards the outside in the radial direction of the first screw thread 2. The intersecting angle β formed by the first crest portion flank 3a and the second crest portion flank 4a is set to be smaller than a flank angle α formed by the thread flanks 2a, 2b. On the other hand, a flank angle of the screw thread 6 of the second screw member 5 is set to be the same as that of the first screw thread 2.

Therefore, in the state that the both screw members 1, 5 are not thread-connected, the first crest portion 3 and the second crest portion 4 are extending axially outward so as to abut against the second screw member 5 shown by a two-dot chain line. Hence, when the first screw member 1 and the second screw member 5 are to be thread-connected as shown in FIG. 2, the first crest portion 3 and the second crest portion 4 elastically deform so as to approach to each other, and is brought into contact with the thread flanks 6a, 6b of the second screw thread 6 by pressure due to a righting moment thereof. By bringing the first crest portion 3 and the second crest portion 4 into contact with the thread flanks 6a, 6b by pressure, a fastening power between the first screw member 1 and the second screw member 5 increases, to thereby exhibit a loosening prevention effect.

At this time, since the flank angle of the first screw thread 2 and the second screw thread 6 is the same, the first screw thread 2 and the second screw thread 6 are in the state that the entire thread flanks from the top portion of the screw thread to the base portion come in contact with each other, on the both surfaces of the thread flanks 2a, 2b. In this state, the loosening prevention effect due to the elastic deformation of the first crest portion 3 and the second crest portion 4 is exhibited. As a result, a strong fastening power can be obtained, and a clamping force applied to the screw thread is distributed over the thread, thereby enabling improvement in the relative strength in thread connection.

FIG. 3 shows the state in which a first screw member 1 similar to that shown in FIG. 1 and FIG. 2 is thread-connected to a second screw member 7. The second screw member 7 comprises a second screw thread 8 formed thereon and a screw groove having an inner diameter $d_1$. As shown in FIG. 3, when the both screw members 1, 7 are to be thread-connected, respective crest portions 3, 4 bite into the second screw member 7 while cutting the bottom surface of the screw groove of the second screw member 7. That is to say, the first screw member 1 has a function of a tapping screw such that the respective crest portions 3, 4 bite into the second screw member 7.

Such an arrangement to provide the first crest portion 3 and the second crest portion 4 allows the second screw member 7 to enter a part of the member 7 into a notch groove 2c formed between these crest portions 3, 4, and hence the contact area increases, so that a large effect of preventing loosening can be obtained. Moreover, when the first screw member 1 is screwed in the second screw member 7 provided with a second screw thread 8 having a diameter of trough shown by a two-dot chain line in FIG. 3, the first screw member 1 and the second screw member 7 can exhibit a large effect of preventing loosening, because of a fastening power generated by the first crest portion 3 and the second crest portion 4 biting into the thread base portion of the second screw member 7, in addition to a fastening power by means of the normal thread connection.

In the case where the inner periphery of the second screw member 7 is made to be a straight surface having an inner diameter $d_2$, when the first screw member 1 is thread-connected to the second screw member 7, the second screw thread 2 as well as the both crest portions 3, 4 cut the screw groove formed in the second screw member 7, and hence the both screw members 1, 7 are fastened more strongly.

In the case where the first screw member 1 is made to bite into the second screw member 7 as a tapping screw as described above, the material of the first screw member 1 is preferably a steel, and the material of the second screw member 7 is preferably a light metal such as aluminum.

FIGS. 4B and 4C show modified examples of the first screw member 1 and the second screw member 7, respectively. The respective first screw member 1 is not a bolt as described above, but a wood screw for woodwork or architecture, and the second screw member 7 is a timber in the case of FIG. 4B, and is a fire refractory material in the case of FIG. 4C. The top of the first screw member 1 shown in FIG. 4B is a cone point, whereas the point of the first screw member 1 shown in FIG. 4C is a cutting edge. In this manner, when the first screw member 1 is a tapping screw, the second screw member 7 may be a plate member, if it is a member having only a prepared hole formed thereon, before being thread-connected to the first screw member 1.

The present invention is not limited to the above-described embodiment, and needless to say, can be modified variously without departing from the scope of the present invention.

For example, in the illustration, the first screw member 1 is shown as a male screw such as a bolt or a wood screw, however, the first screw member 1 may be a female screw such as a nut.

According to the present invention, two screw members thread-connected to each other exhibit a loosening prevention effect due to elastic deformation of the first crest portion and the second crest portion, while bringing the entire thread flank from the base portion to the top portion into contact with the other screw member at the both flanks of the screw thread. As a result, a strong fastening power can be obtained, and a clamping force applied to the screw thread is distributed over the screw thread, thereby enabling improvement in the relative strength in thread connection.

Moreover, when used as a tapping screw, the screw member of the present invention can prevent loosening, since the first crest portion and the second crest portion bite into the member to be connected, in addition to the first screw thread.

What is claimed is:

1. A screw member in tread connection with a second screw member by relative motion about a center of an axis, the screw member comb:
    a screw body;
    a screw thread formed by helically protruding from said screw body, said screw tread having two thread flanks and formed with a notch groove centrally located between the thread flanks at a top portion of said screw thread, said notch groove having a flat bottom;
    a first crest portion formed around said top portion of said screw thread, having a first inner surface extending into said notch groove of said screw thread and having a first flank continuous to one of said tread flanks;
    a second crest portion formed around said top portion of said screw thread, having a second inner surface extending into said notch groove facing said first inner surface via said notch groove, and having a second flank continuous to the other of said thread flanks;
    said first flank and said second flank of said first and second crest portions being provided to form an intersecting angle to be set smaller than a flank angle formed by said two thread flanks; and
    said respective crest portions being provided to elastically deform so as to approach to each other being in the state that substantially the entire flank from a top portion of said screw thread to a base portion of said screw thread come in contact with said second screw member when said screw member is thread-connected wit said second screw member, to thereby apply a fastening power to said second screw member.

2. A screw member according to claim 1, wherein said first screw member is a bolt, and said second screw member is a nut.

3. A screw member according to claim 1, wherein said first screw member is a nut, and said second screw member is a bolt.

* * * * *

UNITED STATES PATENT AND TRADEMARK OFFICE
CERTIFICATE OF CORRECTION

PATENT NO.    : 6,514,025 B2
DATED         : February 4, 2003
INVENTOR(S)   : Tetsuya Watanabe It is certified that error appears in the above-identified patent and that said Letters Patent is hereby corrected as shown below:

Column 6,
Lines 7 and 19, "tread" should read -- thread --.
Line 9, "comb" should read -- comprising --.
Line 34, "wit" should read -- with --.

Signed and Sealed this

Seventh Day of October, 2003

JAMES E. ROGAN
*Director of the United States Patent and Trademark Office*